Figure 1:
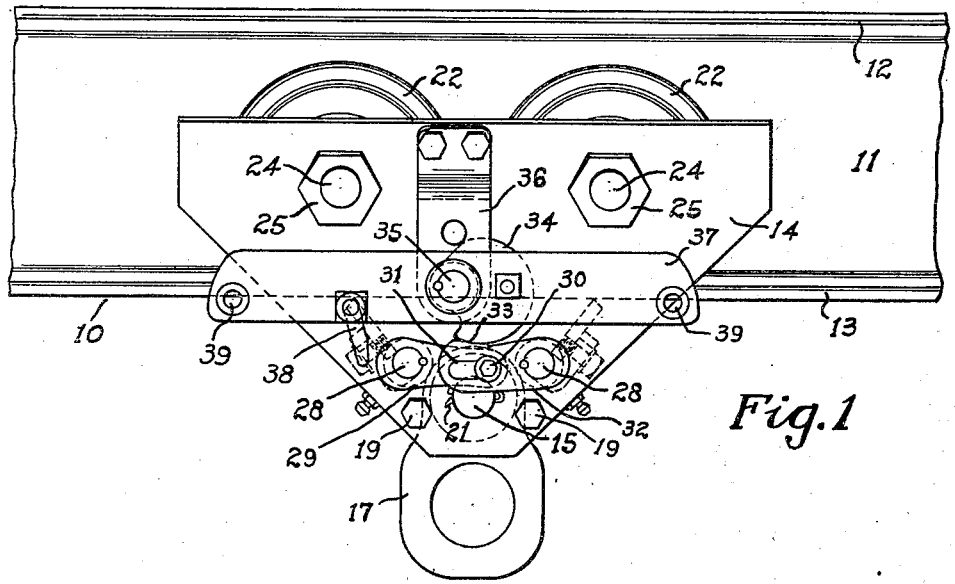

Feb. 3, 1948.  H. F. WRIGHT  2,435,418
TROLLEY LOCKING DEVICE
Filed March 5, 1945  2 Sheets-Sheet 1

Inventor
Hal F. Wright
By Freese and Bishop
Attorneys

Feb. 3, 1948. H. F. WRIGHT 2,435,418
TROLLEY LOCKING DEVICE
Filed March 5, 1945 2 Sheets-Sheet 2
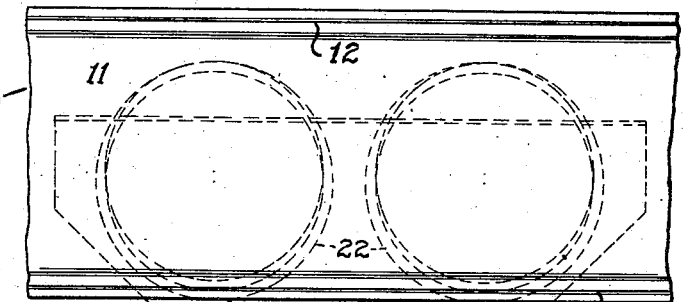
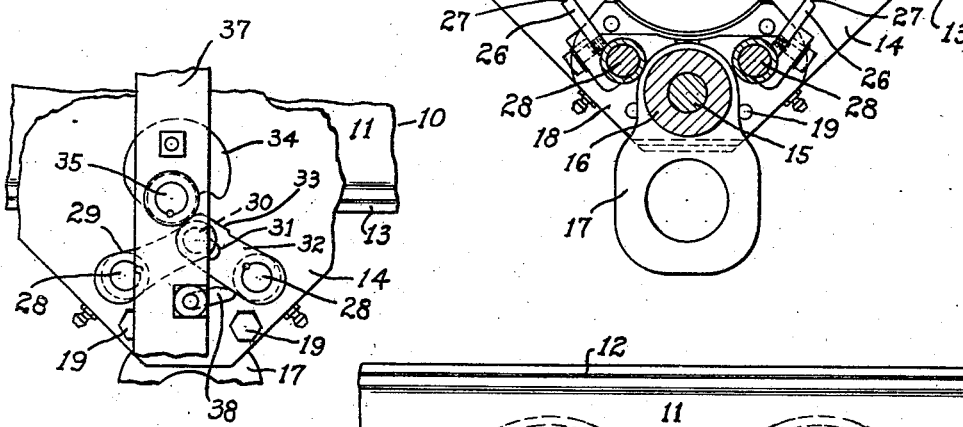
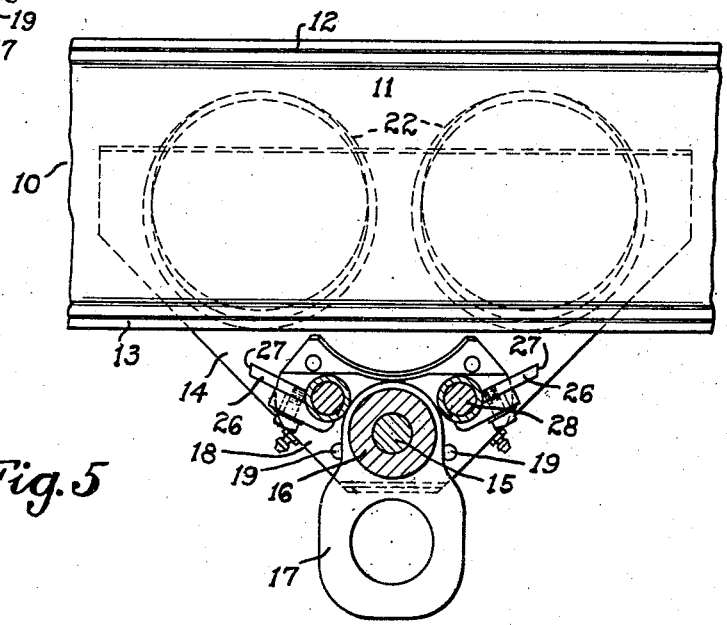
Inventor
Hal F. Wright
By Frease and Bishop
Attorneys Patented Feb. 3, 1948

2,435,418

UNITED STATES PATENT OFFICE 2,435,418

TROLLEY LOCKING DEVICE

Hal F. Wright, Lisbon, Ohio, assignor to Chester Manufacturing Company, Lisbon, Ohio, a firm Application March 5, 1945, Serial No. 581,123

11 Claims. (Cl. 188—42)

The invention relates to trolleys of the type comprising a steel plate frame having flanged wheels riding upon an I-beam rail, and more particularly to a locking device for locking the trolley against movement in either direction upon the I-beam.

Trolleys of this character are at present being used in large numbers upon warships for loading and handling large shells and torpedoes, and, owing to the rolling of the ship in a heavy sea, difficulty is often experienced by the crews operating the trolleys in preventing a trolley, with the heavy load suspended therefrom, from moving too rapidly along the I-beam rail, or from moving in the wrong direction.

Due to the fact that the wheels of these trolleys are usually provided with roller or ball bearings, the trolleys move very easily upon the I-beam rails, and particularly when heavily loaded, it is quite difficult if not impossible to hold the trolley against movement or prevent too rapid movement thereof when the I-beam rail is inclined considerably in either direction due to movement of the ship.

It is therefore an object of the present invention to provide locking means for a trolley of this type for locking the trolley against movement at any point along the I-beam rail.

A further object is to provide means for simultaneously locking the trolley positively against movement in either direction upon the I-beam.

Another object is to provide an easily and quickly operated device for locking or unlocking the trolley.

Still another object of the invention is to provide a cam operated locking device of the character referred to.

A still further object is to provide such a locking device including two opposed cam locking members upon the trolley for frictionally engaging the I-beam at spaced points to rigidly lock the trolley against movement upon the I-beam.

It is a further object of the invention to provide a locking device of this type in which the cam locking members are fixed upon rocker shafts which are provided with rocker arms operated to locking position by means of a rotary cam.

Another object is the provision of such a locking device in which the rocker arms are operated to unlock the cam locking members, by means of an operating lever having a finger for engaging and moving said rocker arms.

Figure 2:
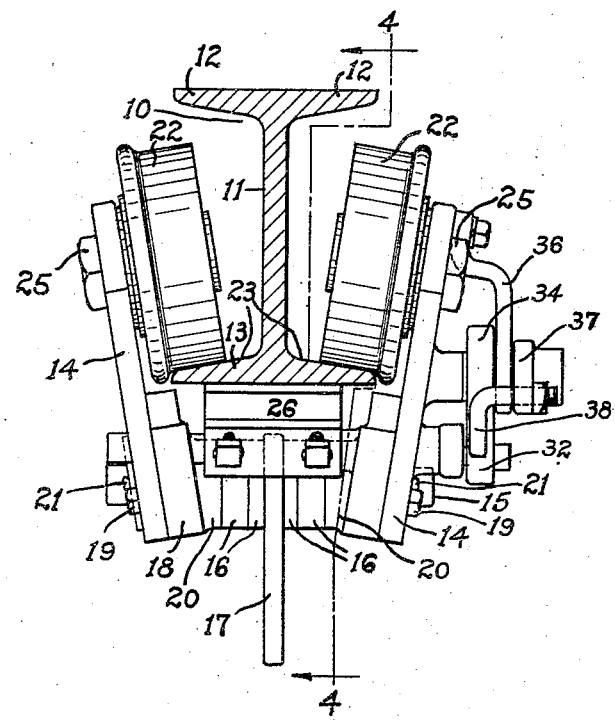

The above objects, together with others which will be apparent from the drawings and following description, or which may be later referred to, may be attained by constructing the improved trolley locking device in the manner illustrated in the accompanying drawings, in which:

Figure 1 is a side elevation of a trolley provided with the improved locking device, showing the same locked against movement upon the I-beam rail;

Fig. 2 an end view of the trolley shown in Figure 1;

Fig. 3 a fragmentary side elevation of the trolley showing the locking device in unlocked position;

Fig. 4 a vertical, longitudinal section through the trolley taken on the line 4—4, Fig. 2 showing the same in locked position, and Fig. 5 a view similar to Fig. 4 showing the trolley in unlocked position.

Referring particularly to the drawings, in which similar numerals designate similar parts throughout, the rail or track, upon which the trolley is mounted for longitudinal movement, may be in the form of an I-beam, indicated generally at 10, and comprising the usual web 11 and upper and lower flanges 12 and 13 respectively.

The trolley comprises two substantially triangular, steel side plates 14, connected together at their lower ends by the equalizing pin 15, spacing collars 16 thereon centrally locating the eye 17 from which a chain hoist or similar device may be suspended for carrying the load.

A reinforcing plate 18 may be connected to the lower end portion of each side plate as by screws 19, and is provided with a hollow boss 20 which receives the equalizing pin 15 and abuts the adjacent spacing collar 16, and cotter pins 21 may be provided upon the ends of the equalizing pin.

As best shown in Fig. 2 the steel side plates 14 are upwardly diverging so that the wheels 22, carried by the side plates, will fit upon the inclined upper surfaces 23 of the lower flanges 13 of the I-beam rail.

Two wheels 22 are carried by each side plate, one wheel being located on each side of the vertical center of the plate, and each wheel is mounted upon a heavy steel axle 24, rigidly attached to the side plate as by a nut 25, and the wheels and axles are preferably roller bearing equipped.

Trolleys substantially as thus far described have been in use for some time, and a considerable number of these trolleys are being used upon warships for loading and handling large shells, torpedoes and the like.

Owing to the motion of the ship when at sea the I-beam rails are frequently moved to inclined position in one direction or the other making it difficult for the crew handling one of these trolleys to prevent its too rapid movement along the rail and sometimes to hold the trolley against movement or to prevent the trolley from moving in the wrong direction depending upon the angle of inclination of the rail.

For this reason various devices have been tried for locking the trolley against movement upon the rail at such times, but such devices as have been attempted are either complicated or expensive in construction or do not satisfactorily lock the trolley upon the rail under all conditions.

The present invention pertains to a simple and easily operated cam locking device for quickly and positively locking the trolley against movement in either direction upon the rail. This locking device comprises two oppositely angled cam locking members 26, in the form of steel plates having beveled edges 27, adapted to frictionally engage the underside of the lower flanges 13 of the I-beam rail on opposite sides of the vertical center of the trolley.

These cam locking plates are fixed upon shafts 28, journalled through the lower portions of the side plates. A rocker arm 29 is fixed upon one end of one shaft 28 and provided with a pin or stud 30 received in the slot 31 of the rocker arm 32 fixed upon the corresponding end of the other shaft 28 so that the cam members 26 are moved in unison.

The rocker arm 32 has a concaved, arcuate surface 33 on its upper side near the free end thereof for contact with the operating cam 34. The cam 34 is fixed upon a shaft 35, journalled through the adjacent side plate 14 and through the bracket 36, and an operating lever 37 is fixed upon the shaft for manually operating the trolley upon the rail by wedging the beveled edges 27 of the cam locking members 26 tightly against the under side of the rail as shown in Fig. 4.

A finger 38 is fixed upon the operating lever 37, at one side of the fulcrum thereof, for contact with the rocker arm 32 to move the rocker arms to the position shown in Fig. 3 to unlock the trolley by swinging the cam locking members 26 downward and outward away from the rail as shown in Fig. 5. If desired, cables, chains or the like may be suspended from opposite ends of the operating lever 37, by means of the aperture 39 formed therein, for operating the lever 37.

It has been found in actual practice that this locking device is very satisfactory. The two oppositely diverging cam locking members 26 engaging the rail on opposite sides of the center of the trolley positively locking the trolley against movement in either direction upon the rail.

By a swinging movement of the operating lever 37 the cam 34 will, through the rocker arms 29 and 32, move the cam locking members into frictional contact with the rail and throw the rocker arms slightly over center as shown in Fig. 1 so that the trolley will remain locked upon the rail until the lever 37 is moved in the other direction at which time the finger 38 thereon throws the rocker arms back over center in the other direction, as shown in Fig. 3 moving the cam locking members 26 out of engagement with the rail.

I claim:

1. In combination with a flanged rail, a trolley including spaced side plates, means connecting the side plates together at their lower ends, pairs of wheels journalled upon the inner sides of the side plates and mounted upon the flanges on opposite sides of the rail, a spaced pair of oppositely angled cam locking members pivotally mounted between the side plates below the rail, one locking member being located below each pair of wheels and means for operating said cam locking members in unison to move them into frictional engagement with the under side of the rail at points substantially below the centers of each pair of wheels to lock the trolley against movement in either direction on the rail.

2. In combination with a flanged rail, a trolley including spaced side plates, means connecting the side plates together at their lower ends, pairs of wheels journalled upon the inner sides of the side plates and mounted upon the flanges on opposite sides of the rail, a spaced pair of upwardly diverging cam locking members pivotally mounted between the side plates below the rail, one locking member being located below each pair of wheels and means for operating said cam locking members in unison to move them into frictional engagement with the under side of the rail at points substantially below the centers of each pair of wheels to lock the trolley against movement in either direction on the rail.

3. In combination with a flanged rail, a trolley including spaced side plates, means connecting the side plates together at their lower ends, pairs of wheels journalled upon the inner sides of the side plates and mounted upon the flanges on opposite sides of the rail, a spaced pair of oppositely angled cam locking members pivotally mounted between the side plates below the rail, and having beveled upper ends, one locking member being located below each pair of wheels and means for operating said cam locking members in unison to move said beveled ends into frictional engagement with the under side of the rail at points substantially below the centers of each pair of wheels to lock the trolley against movement in either direction on the rail.

4. In combination with a flanged rail, a trolley including spaced side plates, means connecting the side plates together at their lower ends, pairs of wheels journalled upon the inner sides of the side plates and mounted upon the flanges on opposite sides of the rail, a spaced pair of oppositely angled cam locking members pivotally mounted between the side plates below the rail, one locking member being located below each pair of wheels and an operating cam for operating said cam locking members in unison to move them into frictional engagement with the under side of the rail at points below the centers of each pair of wheels to lock the trolley against movement in either direction on the rail.

5. In combination with a flanged rail, a trolley including spaced side plates, means connecting the side plates together at their lower ends, wheels journalled upon the inner sides of the side plates and mounted upon the flanges on opposite sides of the rail, a spaced pair of oppositely angled cam locking members pivotally mounted between the side plates below the rail, rocker arms fixed to said cam locking members, means operatively connecting the rocker arms together, and means engaging one of said rocker arms for operating said cam locking members in unison to move them into frictional engagement with the under side of the rail and lock the trolley against movement in either direction on the rail.

6. In combination with a flanged rail, a trolley including spaced side plates, means connecting the side plates together at their lower ends, wheels journalled upon the inner sides of the side plates and mounted upon the flanges on opposite sides of the rail, a spaced pair of upwardly diverging cam locking members pivotally mounted between the side plates below the rail, rocker arms fixed to said cam locking members, means operatively connecting the rocker arms together, and means engaging one of said rocker arms for operating said cam locking members in unison to move them into frictional engagement with the under side of the rail and lock the trolley against movement in either direction on the rail.

7. In combination with a flanged rail, a trolley including spaced side plates, means connecting the side plates together at their lower ends, wheels journalled upon the inner sides of the side plates and mounted upon the flanges on opposite sides of the rail, a spaced pair of oppositely angled cam locking members pivotally mounted between the side plates below the rail, rocker arms fixed to said cam locking members, means operatively connecting the rocker arm together, and an operating cam engaging one of said rocker arms for operating said cam locking members in unison to move them into frictional engagement with the under side of the rail and lock the trolley against movement in either direction on the rail.

8. In combination with a flanged rail, a trolley including spaced side plates, means connecting the side plates together at their lower ends, wheels journalled upon the inner sides of the side plates and mounted upon the flanges on opposite sides of the rail, a spaced pair of oppositely angled cam locking members pivotally mounted between the side plates below the rail, rocker arms fixed to said cam locking members, one of the rocker arms being slotted and a pin upon the other rocker arm received in said slot, and an operating cam engaging one of said rocker arms for operating said cam locking members in unison to move them into frictional engagement with the under side of the rail and lock the trolley against movement in either direction on the rail.

9. In combination with a flanged rail, a trolley including spaced side plates, means connecting the side plates together at their lower ends, wheels journalled upon the inner sides of the side plates and mounted upon the flanges on opposite sides of the rail, a spaced pair of oppositely angled cam locking members pivotally mounted between the side plates below the rail, and having beveled upper ends, rocker arms fixed to said cam locking members, one of the rocker arms being slotted and a pin upon the other rocker arm received in said slot, and an operating cam engaging one of said rocker arms for operating said cam locking members in unison to move said beveled ends into frictional engagement with the under side of the rail and lock the trolley against movement in either direction on the rail.

10. In combination with a flanged rail, a trolley including spaced side plates, means connecting the side plates together at their lower ends, wheels journalled upon the inner sides of the side plates and mounted upon the flanges on opposite sides of the rail, a spaced pair of oppositely angled cam locking members pivotally mounted between the side plates below the rail, rocker arms fixed to said cam locking members, one of the rocker arms being slotted and a pin upon the other rocker arm received in said slot, and an operating cam engaging one of said rocker arms for operating said cam locking members in unison to move them into frictional engagement with the under side of the rail and lock the trolley against movement in either direction on the rail, and a manual operating lever for operating said cam.

11. In combination with a flanged rail, a trolley including spaced side plates, means connecting the side plates together at their lower ends, spaced pairs of wheels journalled upon the inner sides of the side plates and mounted upon the flanges on opposite sides of the rail, a rocker shaft journalled in the side plates below each pair of wheels, oppositely angled cam locking members fixed upon said rocker shafts, rocker arms fixed to said rocker shafts, one of the rocker arms being slotted and a pin upon the other rocker arm received in said slot, and an operating cam engaging one of said rocker arms for operating said cam locking members in unison to move them into frictional engagement with the under side of the rail at points substantially below the centers of each pair of wheels to lock the trolley against movement in either direction on the rail.

HAL F. WRIGHT.

REFERENCES CITED

The following references are of record in the file of this patent:

UNITED STATES PATENTS

| Number | Name | Date |
| --- | --- | --- |
| 878,484 | Moore | Feb. 4, 1908 |